Jan. 28, 1936. M. JUNGE 2,029,174
CHANGE GEAR MECHANISM
Filed June 12, 1934

Inventor: M. Junge
By Karl Viertel
Attorney

Patented Jan. 28, 1936

2,029,174

UNITED STATES PATENT OFFICE 2,029,174

CHANGE GEAR MECHANISM

Max Junge, Chemnitz, Germany, assignor to J. E. Reinecker, A. G., Chemnitz, Germany Application June 12, 1934, Serial No. 730,243

2 Claims. (Cl. 287—53)

My invention relates to change speed gears, feed and kindred mechanisms as applied to and forming important parts for instance of machine tools of various kinds—including lathes, milling—and gear cutting machines, planers, shapers,—and more especially to improvements in speed and feed mechanisms of the type comprising different sets of exchangeable gear wheels—briefly hereinafter called "change wheels"—which are adapted to be removed by hand from their respective shafts and to be replaced by other change wheels of different size.

As a matter of fact known to practitioners much care and attention is required on the part of the operator of the machine for properly exchanging by hand change wheels, and incidentally much time is lost particularly in unlocking with the aid of tools and other implements, such as screw drivers, wrenches, tongs etc. of special design, the change wheels to be withdrawn from their shafts, and in properly relocking the wheels put into the place of the former, so as to secure them against being accidentally displaced in axial direction and becoming unintentionally disengaged from their fellow gear wheels.

The primary object of this invention is to eliminate the said drawbacks by providing an improved time-saving device or attachment of relatively simple construction for change speed gears and feed mechanism of machine tools, so designed as to enable the operator of the machine to unlock, withdraw, replace and re-lock the respective change wheels in a minimum of time viz. quicker than it has been possible heretofore.

The invention further aims at so designing the improved locking device that it can be subsequently applied and at relatively low cost to existing machines, and that the change wheels concerned can be unlocked and re-locked simply by hand, without any tools or accessorial implements of the kind referred to above.

Other objects of the invention will incidentally become apparent hereinafter to practitioners in this field.

The nature and scope of the invention are briefly outlined in the appended claims and will be more fully understood from the following specification taken together with the accompanying drawing in which:

Figure 1:
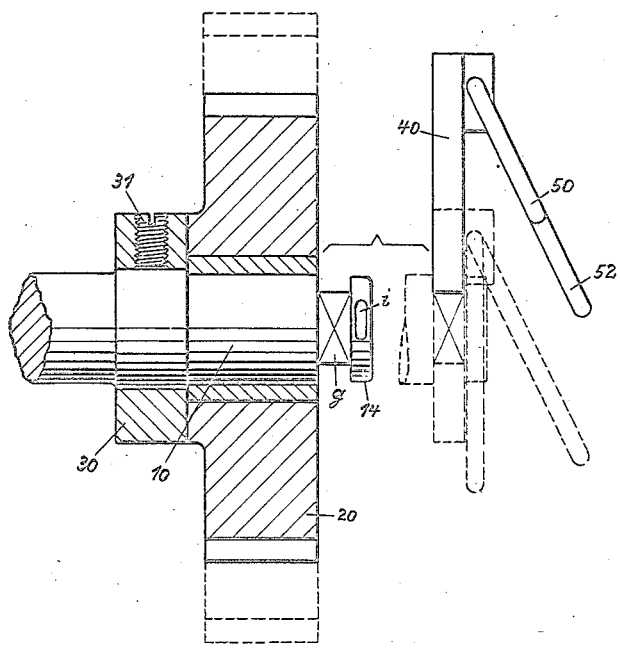
Fig. 1 is a side elevation partly in section showing a change wheel on its trunnion and the way in which the change wheel is locked and unlocked by a disc designed according to this invention.

In Fig. 1 one of the trunnions, on which the change wheels concerned are detachably mounted, is shown, 10 designating the trunnion, 20 the change wheel and 30 an adjusting ring as commonly used, which is secured to the trunnion by a clamping screw 31.

According to this invention the trunnion 10 has an outwardly projecting head 14 which is formed with an intermediate notched or receding section, the latter presenting plane guiding faces $g$, $g'$ for the reception of a slotted disc 40.

As indicated in full and dotted lines in Fig. 1 disc 40 slidingly fits into the said notched section of head 14 and is positively locked therein against axial displacements.

Although disc 40 is usually held in its place by gravitational and frictional forces, I prefer to provide additional means for positively securing the disc 40 in its operative position—particularly with change gear mechanism the trunnions of which rotate jointly with the gear wheels.

In the embodiment of the invention shown by way of an example in the drawing said additional locking means comprise a resilient stirrup-shaped clasp 50 hinged to the locking disc at 51 and being formed with a handle 52. Said clasp is adapted to engage the outer end of the head 14 and is frictionally held in its place or by indentations $i$, $i'$ which are laterally provided on head 14.

Figure 3:
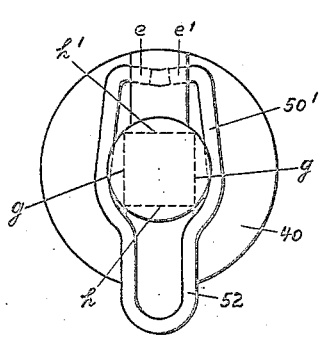
Fig. 3 is a front view of a locking disc having a stirrup of structurally modified design.
Figure 4:
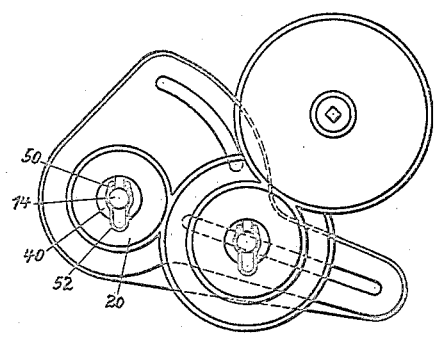
Fig. 4 is a side elevation showing in a smaller scale a typical change gear mechanism for a machine tool, which is provided with locking devices designed according to this invention.

Various other changes and modifications may be conveniently made in the structural details of locking discs for change gear mechanisms described hereinbefore, without departing from the spirit and the salient ideas of this invention:

For instance a clasp 50' may be used, which is resiliently hinged to the disc 40, as shown in Fig. 3: For this purpose the clasp 50' is formed with resilient pivots $e$, $e'$ inwardly extending from the body of the clasp and forming an obtuse angle with each other.

Figure 2:
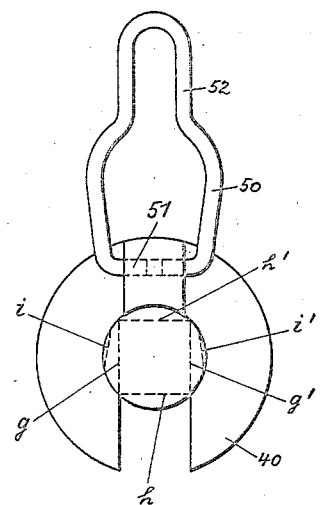
Fig. 2 is a front view of the locking disc and of the stirrup hinged thereto.

In addition to the guiding faces $g$, $g'$ referred to above another set of guiding faces $h$, $h'$ may be conveniently provided at right angles to the former, as seen in Figs. 2 and 3.

What I claim is:

1. In a change gear mechanism of the character set forth a trunnion, a gear wheel detachably mounted on said trunnion, the latter having a head which outwardly projects off the trunnion proper and is notched laterally so as to present a pair of guiding faces, the latter being parallel to each other, a slotted disc adapted to slidingly fit into the notched portion of the said head, and additional locking means for securing said slotted disc in its operative position, said additional locking means comprising a stirrup shaped clasp resiliently hinged to the slotted disc by means of pivots, which extend at an obtuse angle to each other, and being adapted to engage the projecting head of the trunnion.

2. In a change gear mechanism of the character set forth a trunnion, a gear wheel detachably mounted on said trunnion, the latter having a head which outwardly projects off the trunnion proper and is notched laterally so as to present a pair of guiding faces, the latter being parallel to each other, a slotted disc adapted to slidingly fit into the notched portion of the said head, and additional locking means for securing said slotted disc in its operative position, said additional locking means comprising a stirrup shaped clasp resiliently hinged to the slotted disc by means of pivots, which extend at an obtuse angle to each other, and being adapted to engage the projecting head of the trunnion by means of indentations laterally provided in the said head.

MAX JUNGE.